(12) United States Patent
Nguyen

(10) Patent No.: US 8,505,110 B2
(45) Date of Patent: Aug. 6, 2013

(54) APPARATUS AND PROCESS FOR CONTROLLED NANOMANUFACTURING USING CATALYST RETAINING STRUCTURES

(75) Inventor: Cattien Nguyen, San Jose, CA (US)

(73) Assignee: Eloret Corporation, Sunnyvale, CA (US)

( * ) Notice: Subject to any disclaimer, the term of this patent is extended or adjusted under 35 U.S.C. 154(b) by 1185 days.

(21) Appl. No.: 12/287,478

(22) Filed: Oct. 9, 2008

(65) Prior Publication Data

US 2010/0032313 A1 Feb. 11, 2010

Related U.S. Application Data

(60) Provisional application No. 60/998,927, filed on Oct. 10, 2007.

(51) Int. Cl.
*G01Q 60/38* (2010.01)
*G01Q 70/06* (2010.01)

(52) U.S. Cl.
USPC ............................................. 850/40; 850/55

(58) Field of Classification Search
USPC ...................................................... 850/40, 55
See application file for complete search history.

(56) References Cited

U.S. PATENT DOCUMENTS

| | | | | |
|---|---|---|---|---|
| 5,112,772 A * | 5/1992 | Wilson et al. | .................. | 438/426 |
| 5,357,108 A * | 10/1994 | Suzuki et al. | .................... | 850/56 |
| 5,618,760 A * | 4/1997 | Soh et al. | ....................... | 438/703 |
| 5,743,998 A * | 4/1998 | Park | ................................. | 216/51 |
| 6,597,090 B1 * | 7/2003 | Mancevski | ..................... | 313/309 |
| 6,777,693 B2 * | 8/2004 | Nakayama et al. | ......... | 250/492.2 |
| 7,247,384 B2 * | 7/2007 | Cai et al. | ........................ | 428/446 |
| 2003/0094036 A1 * | 5/2003 | Adderton et al. | ................ | 73/105 |
| 2003/0233871 A1 * | 12/2003 | Nguyen et al. | ................... | 73/105 |
| 2005/0172704 A1 * | 8/2005 | Mirkin et al. | .................... | 73/105 |
| 2005/0241374 A1 * | 11/2005 | Schlaf | .............................. | 73/105 |
| 2006/0000263 A1 * | 1/2006 | Su et al. | ........................... | 73/105 |
| 2006/0082379 A1 * | 4/2006 | Liu et al. | ......................... | 324/754 |

* cited by examiner

*Primary Examiner* — Nicholas A Smith
(74) *Attorney, Agent, or Firm* — Jeffrey K. Riddle; Van Cott, Bagley, Cornwall & McCarthy P.C.

(57) ABSTRACT

An apparatus and method for the controlled fabrication of nanostructures using catalyst retaining structures is disclosed. The apparatus includes one or more modified force microscopes having a nanotube attached to the tip portion of the microscopes. An electric current is passed from the nanotube to a catalyst layer of a substrate, thereby causing a localized chemical reaction to occur in a resist layer adjacent the catalyst layer. The region of the resist layer where the chemical reaction occurred is etched, thereby exposing a catalyst particle or particles in the catalyst layer surrounded by a wall of unetched resist material. Subsequent chemical vapor deposition causes growth of a nanostructure to occur upward through the wall of unetched resist material having controlled characteristics of height and diameter and, for parallel systems, number density.

15 Claims, 5 Drawing Sheets

APPARATUS AND PROCESS FOR CONTROLLED NANOMANUFACTURING USING CATALYST RETAINING STRUCTURES

RELATED APPLICATIONS

The present invention claims priority to U.S. Provisional Application Ser. No. 60/998,927, filed Oct. 10, 2007.

GOVERNMENT LICENSE RIGHTS

This invention was made with U.S. Government support under contract NAS2-03144 awarded by NASA. The U.S. Government has certain rights in this invention.

TECHNICAL FIELD OF THE INVENTION

The present invention relates to nanometer-scale lithography and fabrication of nanometer-scale structures on a large scale and in a highly reproducible and controlled manner.

BACKGROUND OF THE INVENTION

Carbon nanotubes (CNTs) and inorganic nanowires (INWs) have been explored for potential applications in nanoelectronics, lasers, field emission devices, displays, chemical and biosensors, detectors and various other nanodevices. In order to realize the potential of CNTs and INWs, the major manufacturing issue now is lack of control of the size (diameter and height) and hence the properties being exploited for the application under consideration.

For example, nanotubes of different diameters will have different bandgaps, electronic, thermal and other properties. In addition to size, orientation becomes important in many applications. A thin film of single-walled carbon nanotubes (SWNTs), where the structure looks like spaghetti, does not have much value in practice. Most of the properties such as electrical and thermal conductivities are high in the axial direction relative to the other directions. Therefore, a film with a random weave of nanotubes often exhibits very poor properties. In the case of nanowires, random orientation on a substrate is typically not suitable for device manufacture as the wires are hard to contact and lack uniformity of density across the wafer surface. In addition to control of diameter and orientation, positional control is also important, regardless of whether a single or multiple CNTs or INWs are in communication between metal electrodes for any type of nanodevice. In many cases, vertical orientation of CNTs or INWs of a specific diameter and height at pre-selected locations is desirable to achieve maximum yield of the device.

A good example for orientation/position/diameter control requirement is the vertical transistor (using silicon or germanium or CNT) with a surround gate. Early demonstrations necessarily used micron long NWs; but to be in step with Moore's law scaling and beyond, the source-to-drain separation and hence the nanowire height have to be under 50 nm now and all the way down to a few nm in the future. Therefore, the height also has to be controlled. Another example is a nanoelectrode array consisting of uniform diameter/height carbon nanofibers for biosensing applications such as lab-on-a-chip, pathogen detection, environmental monitoring etc. Here, each of the carbon nanofibers (CNF) is functionalized with a probe (DNA, mRNA . . . ) suitably selected to hybridize with a target. Signal detection is done electrochemically and therefore each CNF is located just far away from its neighbor to avoid the overlap of the radial diffusion layers and thus crosstalk between neighboring electrodes. Several other examples can be cited such as lasers, detectors, displays, etc., wherein control of diameter, height, position and orientation of CNTs and INWs is critical in manufacturing.

Chemical vapor deposition (CVD) has been successfully used to grow CNTs on patterned substrates, which is the first step towards manufacturing. This catalyzed CVD is similar to the VLS process for the growth of INWs. In all of the above cases, the catalyst must be available in the form of nanosize particles to facilitate CNT and INW growth. Careful analysis has also confirmed a tight correlation between the particle size and the resulting tube or wire diameter. When the catalyst grain size is large or in the form of a smooth thin film, NT/NW growth does not happen or, at best, the growth is sparse. A common approach to catalyst preparation is sputtering or evaporation of the requisite metal into a thin film 1-20 nm in thickness. This is a quick process and amenable to produce patterned wafers. At the growth temperature, the thin film breaks into tiny droplets which serve as the nucleation centers. This is the reason why an inverse correlation between the nanowire density and melting point of the catalyst metal has been reported. Note that the molten metal droplet serves as a 'soft-template' for the nanowire growth. Therefore, the easier the metal melts, the higher will be the growth density.

A major drawback of the thin film approach for catalyst preparation is that the droplet size distribution upon melting of the film is Gaussian. As a result, the resulting NW or CNT diameter distribution would be Gaussian as well. Note that thicker tubes and wires grow slower and hence the diameter distribution in growth would translate into a height variation as well. In addition, melting of the metal film across a wafer gives no positional control of the nanotubes or nanowires. A typical outcome of this approach is a forest of nanotubes and nanowires where diameter and height variations are evident. Even when lithography is used to pre-select the position of the NW growth, the diameter and height can change due to a change in particle size during growth. An alternative approach in the literature has been the use of monodispersed metal colloids such as gold particles. But the particle size and its position cannot be guaranteed once the substrate heating begins. The particles migrate laterally and the size also can change either due to coalescence or breakup.

In summary, control of position and diameter in CNT and INW growth has been elusive to date. What is ideally required is a "virtual fence" around each catalyst particle to arrest its migration from the original position, avoid agglomeration or breakup and retain the original size. One method of remedying this manufacturing issue, as disclosed herein, is a modified Atomic Force Microscope (AFM) approach, which enables large-scale and higher throughput and fabrication of NWTs and INWs having prescribed and uniform diameters, height and positional characteristics.

SUMMARY OF THE INVENTION

An apparatus and method for manufacturing of high-throughput and highly controlled carbon nanotubes and nanowires on a large scale is disclosed. In one embodiment, an apparatus for fabricating catalyst retaining structures is disclosed and comprises a cantilever having a free end, an atomic force microscope tip attached to the free end of the cantilever and a nanotube attached to the atomic force microscope tip, the nanotube having a tip configured for orientation toward a substrate. A voltage difference is imposed between the apparatus and the substrate to produce catalyst retaining structures in the substrate.

In a further embodiment, a first plurality of atomic force microscopes, each having a microscope tip portion and having a nanotube attached to said microscope tip portion configured for orientation toward a substrate is disclosed. A voltage difference is imposed between the apparatus and the substrate to produce catalyst retaining structures in the substrate in parallel. In a yet further embodiment, the plurality of atomic force microscopes is attached to a closed-loop z-direction scanner and, if desired, driven by a closed-loop x,y direction scanner.

In a yet further embodiment of the present invention, first and second pluralities of atomic force microscopes is disclosed, wherein each atomic force microscope has a microscope tip portion and a nanotube attached to said microscope tip portion, wherein both the first and second pluralities of atomic force microscopes are attached to respective closed-loop z-direction scanners, and wherein the first and second closed-loop z-directions scanners are driven by an x,y direction scanner.

A method for fabricating catalyst retaining structures is also disclosed. The method comprises the steps of providing a modified atomic force microscope apparatus having a cantilever having a free end, an atomic force microscope tip attached to the free end of the cantilever and a nanotube attached to the atomic force microscope tip, the nanotube having a tip configured for orientation toward a substrate; providing a substrate adjacent the nanotube tip, the substrate having a resist layer and a metal catalyst layer sandwiched between the resist layer and a substrate; providing a voltage difference between the substrate and the nanotube tip sufficient cause a chemical change in the resist layer; and removing the region of the resist layer having undergone said chemical change to produce one or more catalyst retaining structures.

A method for fabricating nanostructures is also disclosed. The method comprises the steps of providing a modified atomic force microscope apparatus having a cantilever having a free end, an atomic force microscope tip attached to the free end of the cantilever, and a nanotube attached to the atomic force microscope tip, the nanotube having a tip configured for orientation toward a substrate; providing a substrate adjacent the nanotube tip, the substrate having a resist layer and a metal catalyst layer sandwiched between the resist layer and a substrate layer; providing a voltage difference between the substrate and the nanotube tip sufficient cause a chemical change in the resist layer; removing the region of the resist layer having undergone the chemical change to expose a catalyst particle in the catalyst layer; and growing a nanostructure from said catalyst particle.

The foregoing and other embodiments of the present invention will become apparent to those having skill in the art by review of the following detailed description of the present invention, the drawings and the appended claims.

BRIEF DESCRIPTION OF THE DRAWINGS

FIG. 3 is a schematic representation showing the steps of controlled fabricating of nanostructures using the formation of catalyst retaining structures.

DETAILED DESCRIPTION OF THE INVENTION

The discussion above describes the general problem of fabricating uniform nanostructures of CNTs and INWs. Fundamentally this is a direct result of the inability to define and control catalyst particles because of surface chemical and physical phenomena, such as catalyst material diffusion into the substrate as well as a catalyst particle wetting or de-wetting on the surface depending on the chemical interaction of the particular types of metal catalysts and the types of substrates used. It should be noted that these surface diffusion phenomena are exacerbated by the high temperature processes required for CVD growth processes of CNTs and INWs.

As further discussed, free-standing catalyst particles are not generally sufficient for achieving the goal of controlled diameter, length, position and density of nanostructures. Dynamic processes at the high-temperature growth conditions, namely migration and diffusion on a substrate surface, prevent controlled nanomanufacturing of CNTs and INWs. Thus, in order to achieve controlled nanomanufacturing, a new type of catalyst structure is provided in which the phenomenon of catalyst particles' surface diffusion and migration are eliminated. It is important to acknowledge that not addressing these catalyst particle dynamics issues and relying on free-standing catalyst particles will lead to production of nanostructures without controlled diameter, length and position.

The present invention solves this fundamental problem of surface catalyst particle diffusion by employing a CNT tip based scanning probe lithography process for the purpose of patterning catalyst restraining structures (CARS). CARS are defined as nanoscale holes, ranging in diameter from a few nm to a few ten's of nm, in a $SiO_2$ that exposes the underlayer of metal catalyst film. CARS have been previously demonstrated for growing multi-walled nanotubes (MWNTs), in which normal photolithography process was utilized to generate CARs but uniformity was not achieved. As a result, many MWNTs as a bundle were observed to grow from a single hole when the diameter of the hole was greater than 100 nm. However, when the holes are about 20 nm or less, individual straight MWNTs can indeed grown from a single hole with the diameter of the nanotube reflecting the diameter of the hole.

Figure 1:
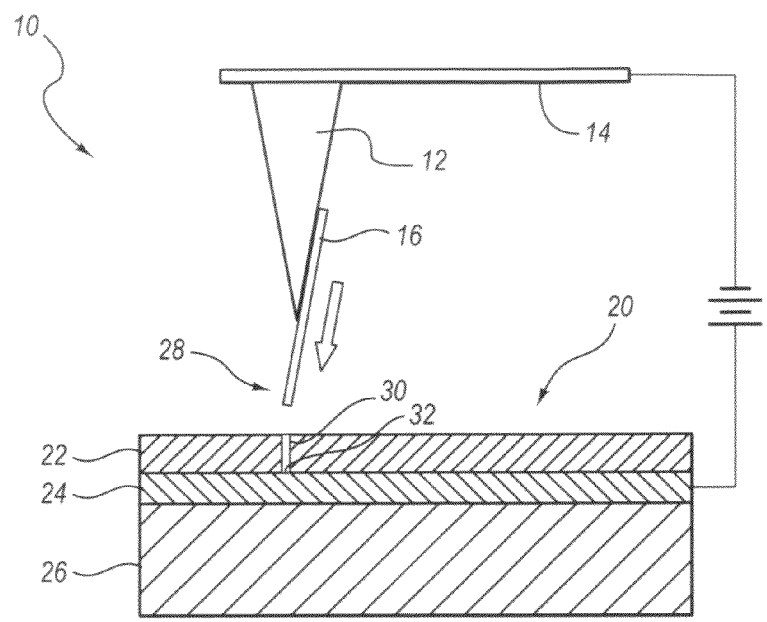
FIG. 1 illustrates a schematic view of a modified AFM tip embodiment of the present invention adjacent a substrate.
Figure 2:
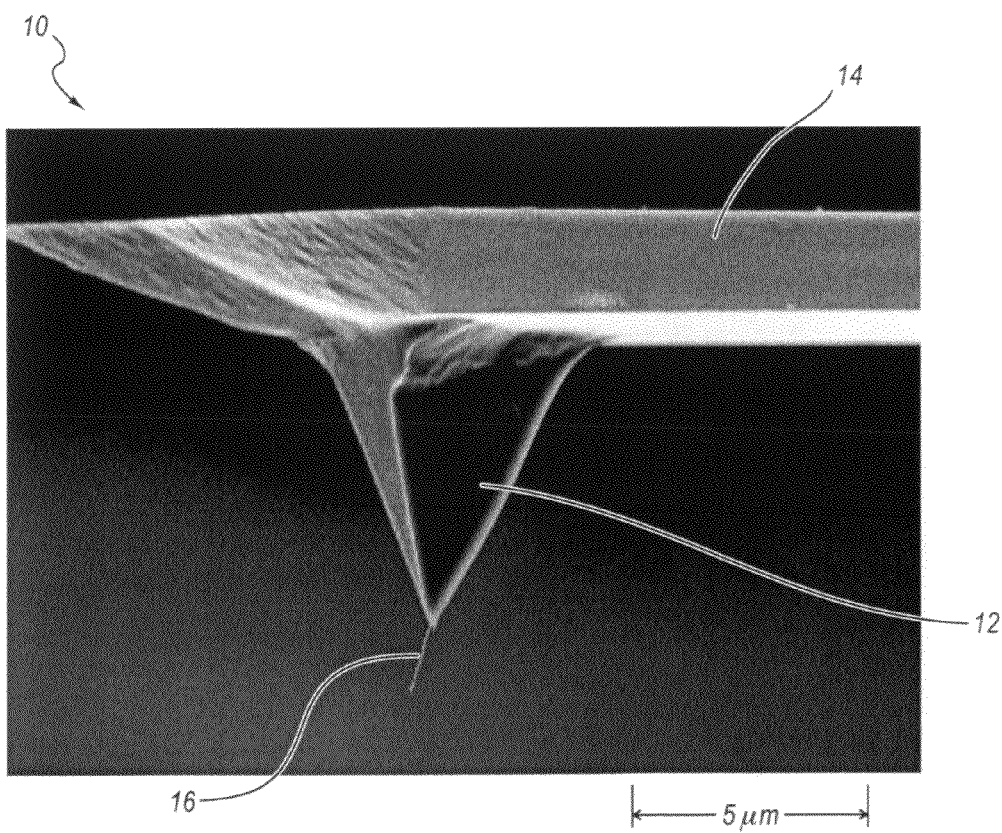
FIG. 2 provides a SEM photograph of one embodiment of the modified AFM tip of the present invention.

Referring to FIG. 1, a first embodiment of the present invention having a modified AFM tip 10 is disclosed. The embodiment is based on a tip-based nanopatterning with organosilicate resist film on top of a metal catalyst film for generating CARs. The modified AFM tip 10 includes a conventional microfabricated Si AFM tip 12 positioned on a cantilever 14. An MWNT 16 is affixed to the conventional AFM tip 12. A scanning electron microscope image of the modified AFM tip 10 is provided in FIG. 2. Adjacent the MWNT 16 is a multi-layered substrate 20 comprising, in one embodiment, a SOG resist layer 22, a metal catalyst layer 24 and a substrate 26, which can be Si or glass or metal. The metal catalyst film 24 may be Fe or Ni for CNT CVD growth, or Au, In, etc., for semiconductor, metal or metal oxide nanowire growth. On top of the metal catalyst film 24 is a film of spin-on glass (SOG) 22, preferably less than one hundred nm thickness of silsesquioxane $\{(RSiO_{1.5})_n\}$ with R=H, $CH_3$, Ph, etc.

An electric field is applied between a tip portion 28 of the MWNT 16 and the substrate 20, resulting in a chemical transformation of the SOG to patterned $SiO_2$ as a result of the electrical current and/or Joule heating localized at the tip portion 28. Depending on the applied voltage and the size and shape of the tip, the field lines emanating from the tip to the metal catalyst film will determine the electron spread in the SOG top layer. Assuming that electrons are solely responsible for catalyzing the chemical conversion of SOG to $SiO_2$, then the electron flow will directly determine the area in the SOG film that was 'exposed' and chemically converted to $SiO_2$. It should be noted that the conversion of organosilicate SOG to $SiO_2$ by a thermal induced mechanism is also a possible mechanism, however, it is undesirable in this tip-based patterning process because the mean free path of thermal diffusion is much higher than that of electrons. In order to have the most control of nanoscale patterning with minimal variation of feature sizes, thermal induced mechanism for chemical conversion to $SiO_2$ should be limited in order to maintain low variation CARS diameters. Based on first order approximation, keeping exposure dose, i.e., current density, to a lower operating limit will minimize the localized thermal dissipation and this may be achieved through optimization of the tip size, types of SOG, thickness of SOG, just to name some of the parameters.

Patterned $SiO_2$ features on the SOG film are chemically etched, using, for example, a buffered HF oxide etch, to generate nanoscale holes 30 that, when created, physically expose an underlayer 32 of metal catalyst particles for the generation of CARs. CNTs or nanowires are grown from these exposed metal catalyst particles in a highly selective manner based on the patterns generated from this tip scanning probe lithography process.

It is important to note that the SOG resist layer 22 will be converted completely to $SiO_2$ after the generation of CARs via thermal treatment. $SiO_2$ is stable and does not flow upward to 1100° C. and therefore is compatible with the subsequent thermal CVD process for growing CNTs and INWs from the patterned CARs. Heterogeneous nanostructures may be fabricated with this method by having varying metal catalyst films in the underlayer.

Figure 3A:
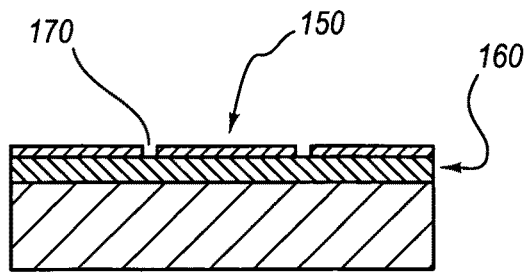
FIG. 3(a) passivating layer provided with openings.
Figure 3B:
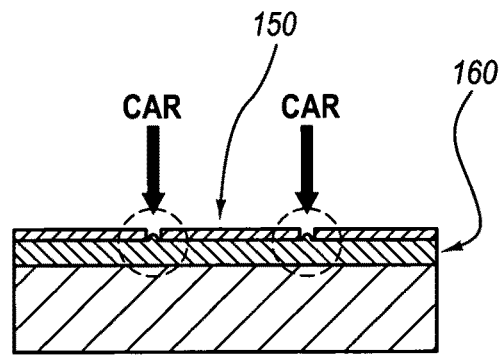
FIG. 3(b) catalyst retaining structures formed.
Figure 3C:
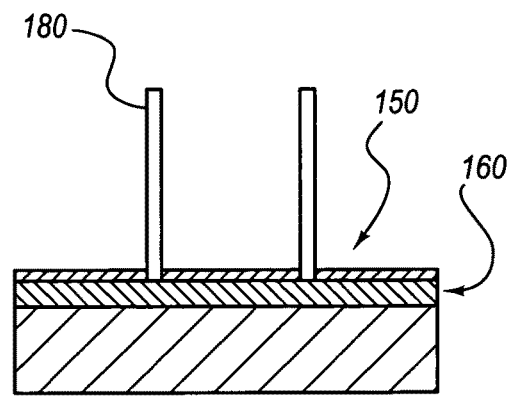
FIG. 3(c) CNTs or INWs grown by CVD.

Referring now to FIG. 3(*a-c*), the process for controlled growth of the nanostructure is more fully explained. A catalyst system contains a passivating layer 150 over a catalyst film 160 and the passivating layer 150 contains nanoscale openings 170 such that the catalyst metal 160 under the passivating layer 150 is exposed to the solid-air interface at the openings. CNTs or INWs 180 are subsequently grown by CVD from these openings in the passivating layer.

The catalyst system depicted in FIG. 3(*a-c*) has all the characteristics of preventing catalyst particle migration and diffusion observed with free-standing catalyst particles. The openings 170 in the $SiO_2$ passivating layer 150 arrest catalyst particle dynamics and in fact enhance the formation of catalyst particles. The openings 150 in the passivating layer 160 act as CARS and their diameter and location define the diameter and density of the nanostructures in the subsequent CVD growth process. As discussed further below, the tip-based method for the generation of CARS has the ability for improving throughput by employing arrays of tips in a highly parallel fashion for generating CARS.

Figure 4:
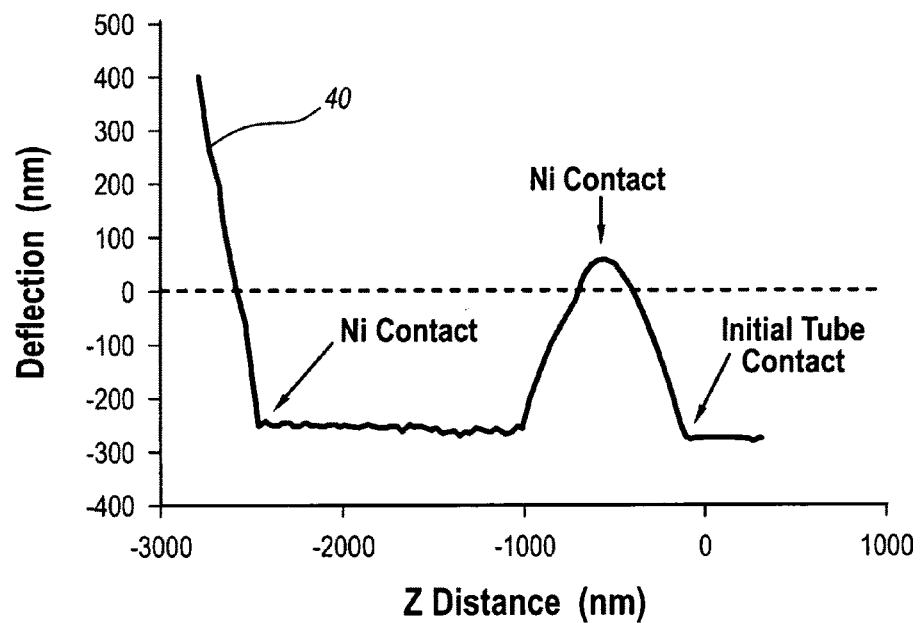
FIG. 4 is a force-defection plot characterizing one embodiment of the modified AFM tip of the present invention.

The high mechanical strength of a MWNT tip is demonstrated in the force-distance plot shown in FIG. 4. The deflection signal 40 shows that for a 2.5 µm long MWNT attached to a contact type cantilever (force constant ~0.2 nN/nm), the MWNT tip could be pushed up to about 500 nm from the initial MWNT tip contact with the surface before the nanotube bends and buckles. It is important to note that the slopes of the deflection signal 40 are similar for 1) after the initial nanotube contact with the surface and 2) after the Ni-coated Si tip contact (indicated as "Ni Contact" in FIG. 4) with the surface. This indicates that at the Z distance from the initial nanotube-surface contact to the nanotube buckling point, the soft cantilever behaves like a compliant spring resulting in nanotube end contact with the surface for a large Z distance regime. This simple fact is very important for lithography in term of maintaining nanotube tip end contact with a surface over a wide range of Z distance variation. This allow for performing lithography with contact mode scanning while ensuring no physical bending of MWNT tips. Applying voltage with a pulsed DC field as a mean to generation patterns will enable for higher rates of pattern generation.

Figure 5:
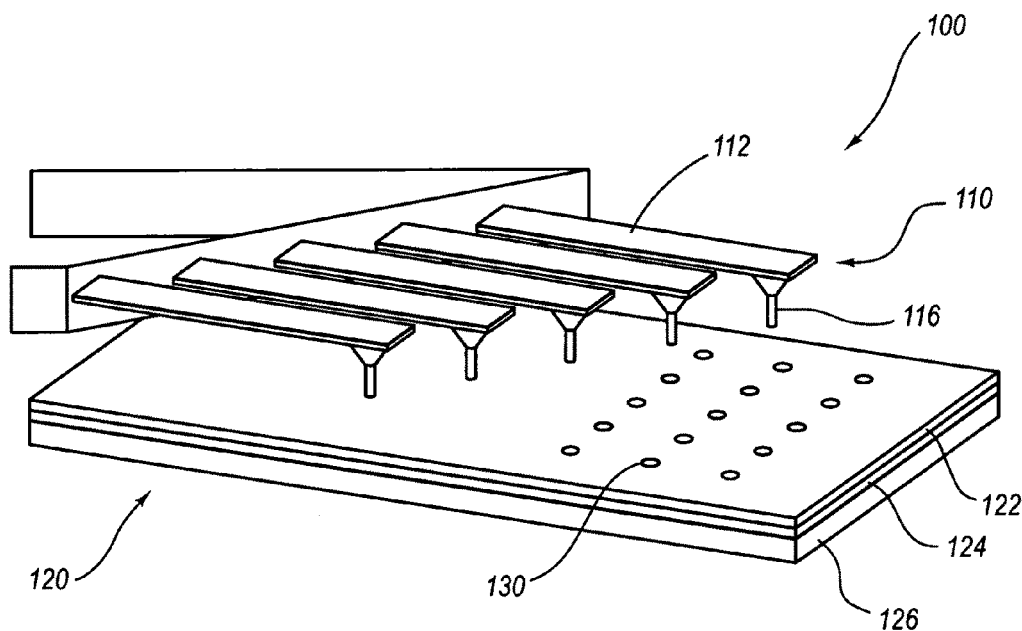
FIG. 5 illustrates a schematic view of a parallel embodiment of the modified AFM tip of the present invention.

In addition to the general problem of Si tip wear, throughput is also a major obstacle with scanning probe lithography because all commercial AFMs are presently based on one cantilever operating in a serial manner. A second embodiment of the present invention, therefore, comprises a cantilever array having many parallel MWNT tips in order to improve throughput for generating CARs. Referring, for example, to FIG. 5, a parallel system 100 having a plurality of modified AFM tips 110 is disclosed. The system 100 is based on multiple piezoelectric self-sensing cantilevers 112 in order to control the degree of each of the multiple tips 116 in contact with a surface—e.g., a multi-layered substrate 120 comprising, in one embodiment, a SOG resist layer 122, a metal catalyst layer 124 and a silicon substrate layer 126. The high throughput scanning probe lithography concept is demonstrated with this system where nanopatterns are generated on surface area of the substrate 120. Specifically, patterned $SiO_2$ features on the SOG film 122 are chemically etched to generate nanoscale holes 130 that, when created, physically expose an underlayer of metal catalyst particles for the generation of CARs.

In a further embodiment of the present invention, MEMS Si chips with 1×N arrays of cantilevers are fabricated to be compatible with existing AFMs. The dimension of typical Si chips holding an AFM cantilever allow for more than 10 cantilevers. In yet further embodiments, due in part to the aforementioned mechanical response of a MWNT tip on a softer contact mode cantilevers, the lithography process is performed using cantilever arrays in contact mode with pulsed DC fields. It should be noted that existing KOH etch processes in the fabrication MEMS Si tips have uncertainties of about 2 µm in all three X,Y, and Z dimensions. Compensation for these misalignments to a large extent is affected by incorporating FIB millings to alter the tip positions of the cantilevers in the array. Also, any large Z distance variation possibility due to the compliant nature of the contact mode cantilever allows for a simple one cantilever force feed-back system if all the MWNT tips are within the Z distance variation range. This is obviously very important in that it ensures that all MWNT tip ends are in contact with the SOG surface during lithography while, at the same time, keeping the feedback system simple. In a yet further embodiment, a current-induced tip shortening process is employed with controlled length uncertainty of about 100 nm. This is another unique aspect of the MWNT tip technology of the present invention.

Figure 6:
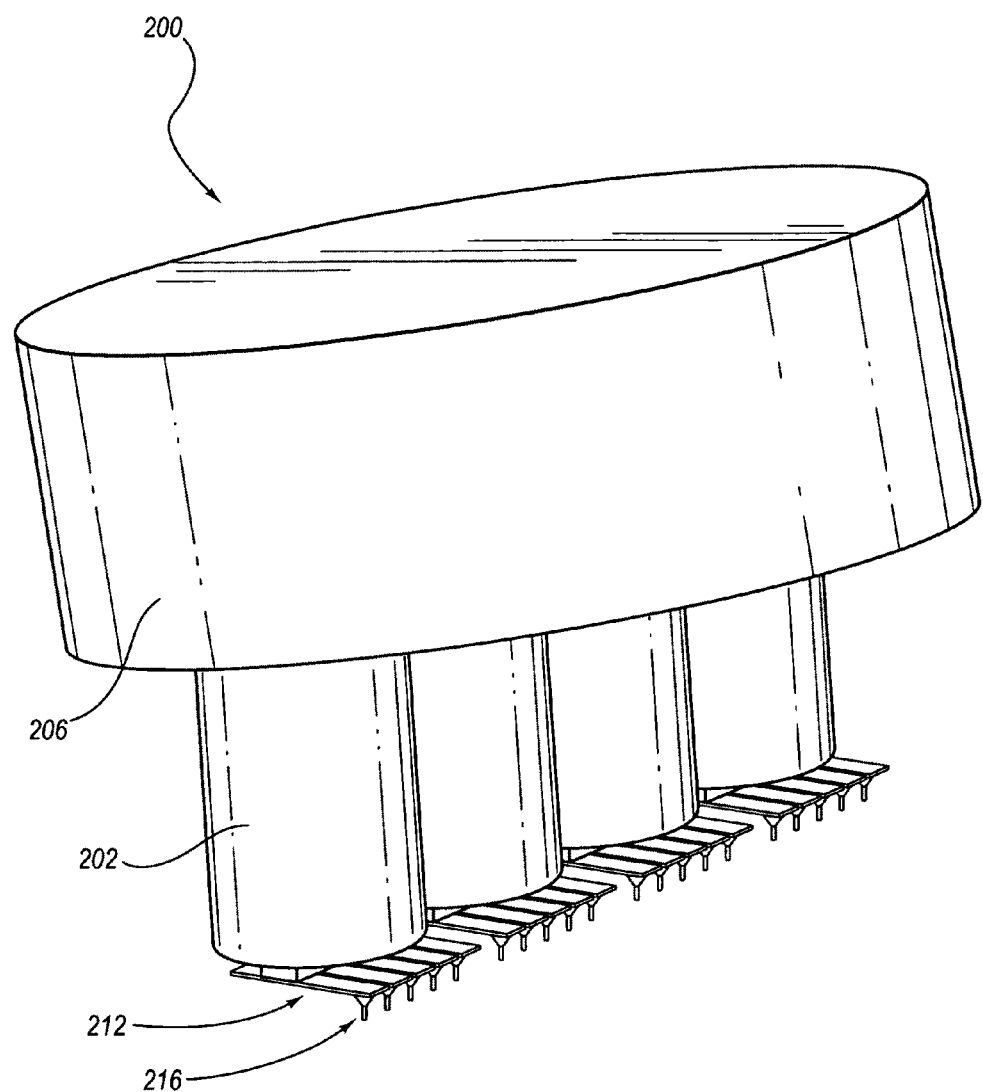
FIG. 6 illustrates a schematic a multiple array scanning lithographic system of the present invention.

Referring now to FIG. 6, a scanning probe system 200 using parallel arrays of closed-loop Z-positioners or scanners 202 having arrays of cantilevers 212 and CNT tips 216 is illustrated. In one embodiment, each array of piezo-electrically driven CNT tips 216 on Si cantilever probes 212 is independently addressable to perform "on-the-fly" nano-patterning while providing in-process position and electrical read-backs for process monitoring and error correction. Lithographic patterns for nanostructures are delineated on substrates by very localized electron emission from the CNTs in contact scanning-probe mode at relatively low applied voltage.

In a yet further embodiment, parallel nanostructure processing is achieved by retrofitting each piezoelectric Z-scanner 202 of existing AFMs with an array of Si cantilever probes, e.g. five or more per Z-scanner 202. All Z-scanners 202 are driven together by a common X,Y-scanner 206 which generates the 2D lithographic patterns of nanostructures. Each array of cantilevers 212 and tips 216 on a Z-scanner 202 can be collectively operated with only one optical position-sensitive feedback for approaching the substrate surface, or individually modulated by a specified feedback on each array. While the CNT tips 216 in each cantilever array are engineered with relatively uniform height, the mechanical properties of MWNTs are such that they can accommodate high height disparity among the Si cantilever probes and CNT tip combinations. This mechanical latitude in conjunction with the low force constant of the Si cantilever probes, which behaves as a compliant spring, ensures good contacts with the substrate for all CNT tips. In this contact mode, nanostructure lithography is achieved without the ultra-sensitive feedback requirement, which is typically <0.1 nm for imaging mode.

While the foregoing embodiment may be constructed as massively parallel, the localization and contact-mode operation of the system with closed-loop positioning enables seamless in-process error detection, site retrace, characterization, and correction at each patterned nanostructure site. The reason lies in that any mutual force interaction between surface and AFM probe is subject to AFM measurements, including: mechanical, electrical, thermal and magnetic properties.

Figure 7A:
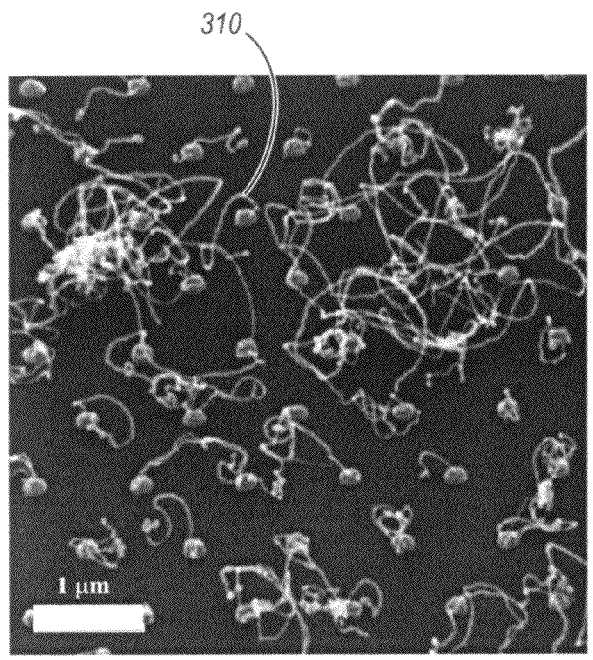
FIG. 7(a) is an SEM image demonstrating traditional CVD on well-defined nanoparticle catalysts where lack of growth control is obtained.
Figure 7B:
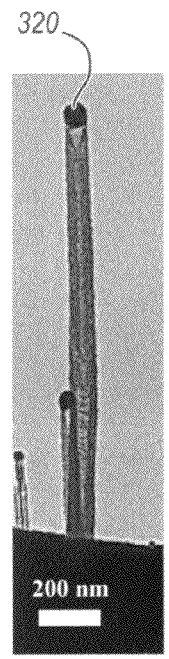
FIG. 7(b) is a TEM image of carbon nanofibers grown by plasma enhanced CVD.

The tip-based patterning approach disclosed above with respect to each of the various embodiments creates a catalyst template that serves to define the size and location of nanostructures. The next piece of the fabrication approach is to employ CVD to translate the catalyst patterns into carbon nanotubes and/or inorganic nanowires. Traditional CVD methods for nanotube fabrication would be inadequate to produce controlled nanomanufacturing even with a well defined catalyst pattern. Experiments with e-beam patterned catalyst spots via the traditional approach leads to uncontrolled random CNTs 310 as shown in FIG. 7(a). One alternate approach that has been demonstrated is to use the electric fields present in a plasma enhanced CVD process to produce nanostructures of vertical or angled geometries 320 as shown in FIG. 7(b). However, this technique results in structures that do not have the graphitic nanostructure of carbon nanotubes and thus have significantly degraded electrical, thermal and mechanical properties.

Figure 7C:
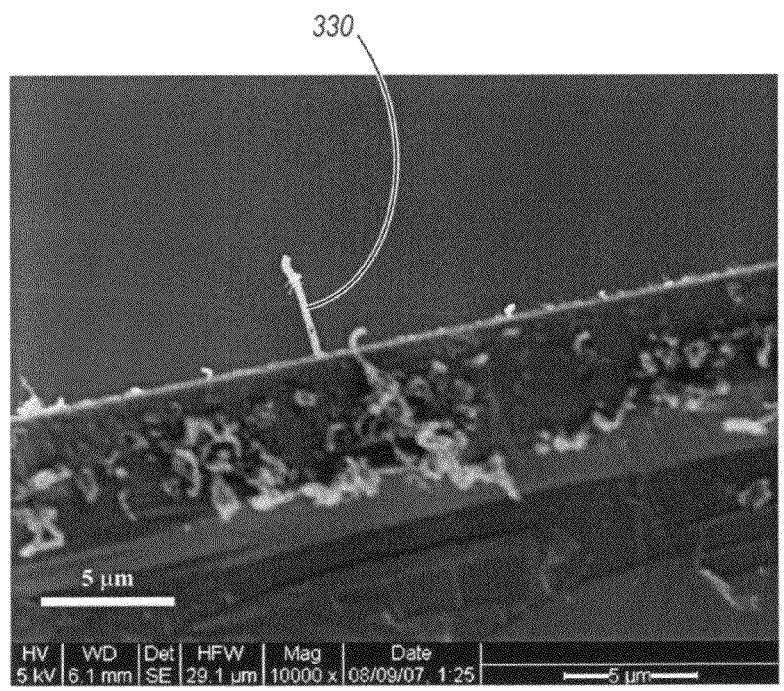
FIG. 7(c) is an SEM image showing CNT growth using the present invention.

One embodiment of the present invention considers a variation on these processes by introducing an electrical field into the CVD process without initiating a plasma. Such an approach has been attempted on a small scale previously but has not otherwise been incorporated into a larger scale reactor design because the fields required to obtain significant alignment are greater than 1 kV/mm and would cause arc or plasma formation in any of the CVD reactors employed to date. In order to avoid this condition, it is necessary to design the CVD reactor to operate above atmospheric pressure. Preliminary results showing growth of a nanostructure 330 using the present invention as described above is shown in FIG. 7(c).

While certain embodiments and details have been included herein and in the attached invention disclosure for purposes of illustrating the invention, it will be apparent to those skilled in the art that various changes in the methods and apparatuses disclosed herein may be made without departing from the scope of the invention, which is defined in the appended claims.

What is claimed is:

1. An apparatus for fabricating catalyst retaining structures; comprising:
   a first plurality of atomic force microscopes, each atomic force microscope comprising:
      a cantilever having a free end;
      an atomic force microscope tip attached to the free end of the cantilever;
      a nanotube attached to said atomic force microscope tip, said nanotube having a tip configured for orientation toward a substrate; and
   a second plurality of atomic force microscopes, each atomic force microscope comprising:
      a cantilever having a free end;
      an atomic force microscope tip attached to the free end of the cantilever;
      a nanotube attached to said atomic force microscope tip, said nanotube having a tip configured for orientation toward a substrate;
   in which each cantilever is coupled to a silicon chip;
   in which the first and second plurality of atomic force microscopes are attached to respective first and second closed-loop z-direction scanners; and
   in which the first and second closed-loop z-direction scanners are driven by a closed loop x,y direction scanner.

2. The apparatus of claim 1, wherein each cantilever is constructed using silicon.

3. The apparatus of claim 1, wherein each cantilever has a second end in communication with a voltage source.

4. The apparatus of claim 1, wherein each nanotube attached to the atomic force microscope is a multi-walled carbon nanotube.

5. The apparatus of claim 1, wherein each cantilever and atomic force microscope are constructed integrally from the same material.

6. The apparatus of claim 1, wherein each nanotube is attached to each atomic force microscope using an electric welding process.

7. An apparatus for fabricating catalyst retaining structures; comprising:
   a first plurality of atomic force microscopes, each having a microscope tip portion and having a nanotube attached to said microscope tip portion; and
   a second plurality of atomic force microscopes, each having a microscope tip portion and having a nanotube attached to said microscope tip portion;
   in which the first and second plurality of atomic force microscopes are attached to respective first and second dosed-loop z-direction scanners; and
   in which the first and second closed-loop z-direction scanners are driven by a closed loop x,y direction scanner.

8. The apparatus of claim 7, further a voltage source in communication with said first and second plurality of atomic force microscopes.

9. The apparatus of claim 7, wherein said first and second plurality of atomic force microscopes are each attached to a silicon chip.

10. The apparatus of claim 8, wherein said voltage source is a pulsed direct current source.

11. A method for fabricating catalyst retaining structures, comprising:
providing a first plurality of modified atomic force microscope apparatus, each of said apparatus including:
a number of cantilevers each having a free end;
an atomic force microscope tip attached to each of the free ends of the cantilevers;
a nanotube attached to each of said atomic force microscope tips, said nanotubes having a tip configured for orientation toward a substrate;
a plurality of closed-loop z-direction scanners each coupled to the end of each of the cantilevers opposite the free ends; and
a number of closed-loop x,y direction scanners coupled to a sub-set of the plurality of closed-loop z-direction scanners such that the each x-y direction scanner drives the sub-set of the plurality of closed-loop z-direction scanners;
providing a second plurality of modified atomic force microscope apparatus, each of said apparatus including:
a number of cantilevers each having a free end;
an atomic force microscope tip attached to each of the free ends of the cantilevers;
a nanotube attached to each of said atomic force microscope tips, said nanotubes having a tip configured for orientation toward a substrate;
a plurality of closed-loop z-direction scanners each coupled to the end of each of the cantilevers opposite the free ends; and
a number of closed-loop x,y direction scanners coupled to a sub-set of the plurality of closed-loop z-direction scanners such that the each x-y direction scanner drives the sub-set of the plurality of closed-loop z-direction scanners;
providing a substrate adjacent said nanotube tip, said substrate having a resist layer and a metal catalyst layer sandwiched between the resist layer and a substrate;
providing a voltage difference between said substrate and said nanotube tip sufficient cause a chemical change in the resist layer; and
removing the region of the resist layer having undergone said chemical change;
attaching each of said first and second plurality of modified atomic force microscope apparatus to one of the plurality of closed-loop z-direction scanners, in which the number of closed-loop z-direction scanners are driven by the number of closed loop x,y direction scanner.

12. A method for fabricating nanostructures, comprising:
providing a first plurality of modified atomic force microscope apparatus, each said apparatus including:
a cantilever having a free end;
an atomic force microscope tip attached to the free end of the cantilever;
a nanotube attached to said atomic force microscope tip, said nanotube having a tip configured for orientation toward a substrate; and
a closed-loop z-direction scanner coupled to the end of the cantilever opposite the free end;
providing a second plurality of modified atomic force microscope apparatus, each said apparatus including:
a cantilever having a free end;
an atomic force microscope tip attached to the free end of the cantilever;
a nanotube attached to said atomic force microscope tip, said nanotube having a tip configured for orientation toward a substrate; and
a closed-loop z-direction scanner coupled to the end of the cantilever opposite the free end;
providing a substrate adjacent said nanotube tip, said substrate having a resist layer and a metal catalyst layer sandwiched between the resist layer and a substrate layer;
providing a voltage difference between said substrate and said nanotube tip sufficient cause a chemical change in the resist layer;
driving each of the closed z-direction scanner with a closed loop x,y direction scanner;
removing the region of the resist layer having undergone said chemical change to expose a catalyst particle in the catalyst layer; and
growing a nanostructure from said catalyst particle.

13. The method of claim 12, wherein removing said regions of the resist layer is performed using a buffered HF etch.

14. The method of claim 12, wherein growing nanostructures from the catalyst layer is performed using chemical vapor deposition.

15. The method of claim 12, wherein the resist layer is a spin-on-glass resist layer.

* * * * *

UNITED STATES PATENT AND TRADEMARK OFFICE
CERTIFICATE OF CORRECTION

PATENT NO. : 8,505,110 B2
APPLICATION NO. : 12/287478
DATED : August 6, 2013
INVENTOR(S) : Cattien Nguyen Page 1 of 1

It is certified that error appears in the above-identified patent and that said Letters Patent is hereby corrected as shown below:

In the Claims

Column 8, Line 62, Claim 7, change "dosed-loop z-direction scanners; and" to-- "closed-loop z-direction scanners; and"

Signed and Sealed this
Twenty-seventh Day of May, 2014

Michelle K. Lee
*Deputy Director of the United States Patent and Trademark Office*